United States Patent
Sawamura et al.

(10) Patent No.: US 6,522,959 B1
(45) Date of Patent: Feb. 18, 2003

(54) CONTROL APPARATUS FOR HYBRID VEHICLE

(75) Inventors: Kazutomo Sawamura, Wako (JP); Teruo Wakashiro, Wako (JP); Atsushi Matsubara, Wako (JP); Shinichi Kitajima, Wako (JP); Hideyuki Takahashi, Wako (JP); Yasuo Nakamoto, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 15 days.

(21) Appl. No.: 09/679,889

(22) Filed: Oct. 5, 2000

(30) Foreign Application Priority Data

Oct. 8, 1999 (JP) .......................................... 11-288750

(51) Int. Cl.[7] .......................... B60L 11/00; G05D 1/00; G06F 17/00; B60K 1/00
(52) U.S. Cl. .............................. 701/22; 701/99; 477/2; 477/20; 180/65.1; 180/65.2; 180/65.4
(58) Field of Search ........................ 701/22, 99; 477/2, 477/20; 318/139; 180/65.2, 65.1, 65.4

(56) References Cited

U.S. PATENT DOCUMENTS

| | | | | |
|---|---|---|---|---|
| 5,656,921 A | * | 8/1997 | Farrall ........................ | 180/65.2 |
| 5,806,617 A | * | 9/1998 | Yamaguchi ................ | 180/65.2 |
| 5,939,848 A | * | 8/1999 | Yano et al. ................. | 180/65.4 |
| 6,007,443 A | * | 12/1999 | Onimaru et al. ........... | 180/65.2 |
| 6,018,694 A | * | 1/2000 | Egami et al. ............... | 180/65.2 |
| 6,164,400 A | * | 12/2000 | Jankovic et al. ........... | 180/65.2 |
| 6,234,932 B1 | * | 5/2001 | Kuroda et al. ............. | 180/65.1 |
| 6,253,127 B1 | * | 6/2001 | Itoyama et al. ........... | 123/179.1 |
| 6,262,491 B1 | * | 7/2001 | Kitajima et al. ........... | 180/65.2 |
| 6,269,290 B1 | * | 7/2001 | Egami et al. .................. | 290/45 |
| 6,278,915 B1 | * | 8/2001 | Deguchi et al. ........... | 180/65.2 |
| 6,315,068 B1 | * | 11/2001 | Hoshiya et al. ............ | 180/65.2 |

FOREIGN PATENT DOCUMENTS

| | | |
|---|---|---|
| JP | 07-123509 | 5/1995 |
| JP | 08-105345 | 4/1996 |
| JP | 09-53487 | 2/1997 |

* cited by examiner

*Primary Examiner*—Jacques H. Louis-Jacques
*Assistant Examiner*—Brian Broadhead
(74) *Attorney, Agent, or Firm*—Armstrong, Westerman & Hattori, LLP

(57) ABSTRACT

A control apparatus for a hybrid vehicle that can improve the fuel consumption ratio while providing a good drivability is provided. It is determined whether the temperature of a catalyst in an exhaust system is equal to or below a predetermined temperature, and if this condition is satisfied, a Wide Open Throttle determination degree of throttle opening value for determining whether to carry out the Wide Open Throttle control is looked up in a table. Next, it is determined whether a degree of throttle opening is above the Wide Open Throttle determination degree of throttle opening value, and if this condition is satisfied, it is determined whether a remaining battery charge is equal to or above one within the normal use region. If this condition is satisfied, it is determined whether an engine speed is equal to or above a degree of throttle opening Wide Open Throttle prohibiting upper limit engine speed value. If this condition is satisfied, it is determined whether the value of a subtraction timer is zero, and if it is not zero the increase in the amount of fuel is prohibited.

5 Claims, 5 Drawing Sheets

CONTROL APPARATUS FOR HYBRID VEHICLE

BACKGROUND OF THE INVENTION

1. Field of the Invention

The present invention relates to a control apparatus for a hybrid vehicle with an engine and a motor, and in particular, to a control apparatus for a hybrid vehicle which controls the quantity of the increase in fuel to be supplied to the engine.

2. Description of the Related Art

Conventionally, hybrid vehicles having motors as power sources for driving the vehicles in addition to engines are known.

A parallel hybrid vehicle is a kind of hybrid vehicle that uses the motor as an auxiliary power source to supplement (assist) the output of the engine. Such a parallel hybrid vehicle performs various operations, for example, making the motor assist the output of the engine in the course of acceleration, and charging a battery by deceleration regeneration in the course of deceleration, so as to maintain sufficient remaining charge (electric energy) in the battery in order to meet demands of drivers (as disclosed, for example, in Japanese Unexamined Patent Application, First Publication, No. Hei 7-123509).

In the aforementioned conventional control apparatus for a hybrid vehicle, when a degree of throttle opening (e.g., the extent of the throttle opening) is high, controls to increase quantity of fuel supplied to an engine are carried out as in a gasoline engine vehicle so as to maintain drivability. However, the motor supplements the output of the engine in the hybrid vehicle, and within a range in which the engine speed is a predetermined value or less, while it is possible to secure adequate drivability with the assistance of the output of the engine by the motor, this may cause the problem that fuel consumption deteriorates due to an excessive increase in the amount of fuel.

SUMMARY OF THE INVENTION

It is therefore an object of the present invention to provide a control apparatus for a hybrid vehicle which prohibits the increase in the amount of fuel supplied to the engine within a range in which the engine speed is a predetermined value or less, and thereby drivability can be guaranteed and fuel consumption can be improved.

In order to accomplish the object, the first aspect of the present invention provides a control apparatus (in the embodiment described hereinafter, control apparatus 1) for a hybrid vehicle which is provided with an engine (engine E) which outputs the driving force of the vehicle (hybrid vehicle 10); a motor (motor M) which assists the output of the engine in accordance with the operational state of the vehicle; and an electricity storage device (battery 22), which stores generated energy, when the motor is employed as a generator by the output of the engine, and regenerated energy, which is produced by the regenerative state of the motor when the vehicle decelerates, comprising: a degree of throttle opening detector (step S6) for detecting the degree of throttle opening in the engine; an engine speed detector (step S2) for detecting the speed of the engine; a degree of throttle opening setting device for fuel amount increase determination (step S103) for setting a degree of throttle opening for fuel amount increase determination, which is used to determine whether the amount of fuel supplied to the engine should be increased, according to the engine speed; and a fuel amount increase prohibiting device (steps S104, S110, and S113 to S115) for prohibiting an increase in the amount of fuel supplied to the engine, when the degree of throttle opening detector detects that the degree of throttle opening is equal to or above the degree of throttle opening for fuel amount increase determination and the engine speed detector detects that the engine speed is equal to or below a predetermined engine speed.

According to the above-mentioned structure, in the region in which the engine speed is equal to or below a predetermined value, the assistance of the output of the engine by the motor makes it possible to provide good drivability, and prohibiting an increase in the amount of fuel supplied to the engine provides reduced fuel consumption.

The second aspect of the present invention provides a control apparatus for a hybrid vehicle in accordance with the first aspect of the present invention, further comprising: a remaining charge calculator (battery ECU 13) for calculating the remaining charge in the electricity storage device, wherein, when the remaining charge calculated by the remaining charge calculator is equal to or above a predetermined remaining charge, the fuel amount increase prohibiting device prohibits to increase the amount of fuel supplied to the engine (steps S106 and S107).

According to the above-mentioned structure, when it is determined that the remaining charge in the electricity storage device is equal to or above a predetermined value in the region in which the engine speed is equal to or below a predetermined value, the assistance of the output of the engine by the motor makes it possible to provide good drivability, and prohibiting the increase in the amount of fuel supplied to the engine provides reduced fuel consumption.

In a third aspect of the present invention, a control apparatus for a hybrid vehicle in accordance with the first aspect of the present invention, further comprising: a time measuring device (steps S105 and S112) for measuring the duration of the state in which the degree of throttle opening detector detects that the degree of throttle opening is equal to or larger than the degree of throttle opening for fuel amount increase determination; and a fuel amount increasing device (steps S108 to S110) for prohibiting the operation of the fuel amount increase prohibiting device so as to increase the amount of fuel supplied to the engine, when the duration measured by the time measuring device is equal to or larger than a predetermined time.

According to the above-mentioned structure, when the state in which the degree of throttle opening is high continues for a predetermined time or more, it is determined that the driver is requesting an increase in the output, then the amount of fuel supplied to the engine is increased so as to respond to the will of the driver and provide good drivability.

In a fourth aspect of the present invention, a control apparatus for a hybrid vehicle in accordance with the first aspect of the present invention, further comprising: a fuel amount increasing device (steps S108, S109, and S111) for measuring the delay of the ignition timing in the engine, and for prohibiting the operation of the fuel amount increase prohibiting device so as to increase the amount of fuel supplied to the engine, when the delay of the ignition timing in the engine is above a predetermined time.

According to the above-mentioned structure, even if there is a possibility that the use of inferior gasoline as fuel degrades the exhaust system, the amount of fuel supplied to the engine is increased, and the exhaust system can be protected.

In a fifth aspect of the present invention, a control apparatus (control apparatus 1) for a hybrid vehicle which is provided with an engine (engine E) which outputs the driving force of the vehicle (hybrid vehicle 10); a motor (motor M) which assists the output of the engine in accordance with the operational state of the vehicle; and an electricity storage device (battery 22), which stores generated energy, when the motor is employed as a generator by the output of the engine, and regenerated energy, which is produced by the regenerative state of the motor when the vehicle decelerates, comprising: a degree of throttle opening detector (step S6) for detecting the degree of throttle opening in the engine; a remaining charge calculator (battery ECU 13) for calculating the remaining charge in the electricity storage device; an engine speed detector (step S2) for detecting the speed of the engine; a degree of throttle opening setting device for fuel amount increase determination (step S203) for setting a degree of throttle opening for fuel amount increase determination, which is used to determine whether the amount of fuel supplied to the engine should be increased, according to the engine speed for each one of a plurality of predetermined values of the remaining charge; a degree of throttle opening change calculator (step S204) for calculating the amount of the change in the degree of throttle opening for fuel amount increase determination with respect to the value of the remaining charge; a degree of throttle opening correction device for fuel amount increase determination (step S204) for correcting the degree of throttle opening for fuel amount increase determination with respect to the value of the remaining charge in accordance with the degree of throttle opening change calculator; a time measuring device (steps S205 to S207) for measuring the duration of the state in which it is detected that the degree of throttle opening detected by the degree of throttle opening detector is equal to or above the degree of throttle opening for fuel amount increase determination that is corrected by the degree of throttle opening correction device for fuel amount increase determination; and a fuel amount increasing device (steps S208 and S209) for increasing the amount of fuel supplied to the engine, when the duration measured by the time measuring device is equal to or above a predetermined time.

According to the above-mentioned structure, the degree of throttle opening of the fuel amount increase determination for determining whether to increase the amount of fuel is made variable, depending on the remaining charge in the electricity storage device. Accordingly, when there is little remaining charge, by setting the degree of throttle opening of the fuel amount increase determination to a relatively low value, even if the amount of the increase in the degree of throttle opening is small, the increase in the amount of fuel can be carried out at an early stage, to provide good drivability. In contrast, when there is much remaining charge, by setting the degree of throttle opening of the fuel amount increase determination to a relatively high value, the increase in the amount of fuel is prohibited until an increase of the output is strongly demanded, so that the fuel consumption ratio can further be improved.

DETAILED DESCRIPTION OF THE PREFERRED EMBODIMENTS

Figure 1:
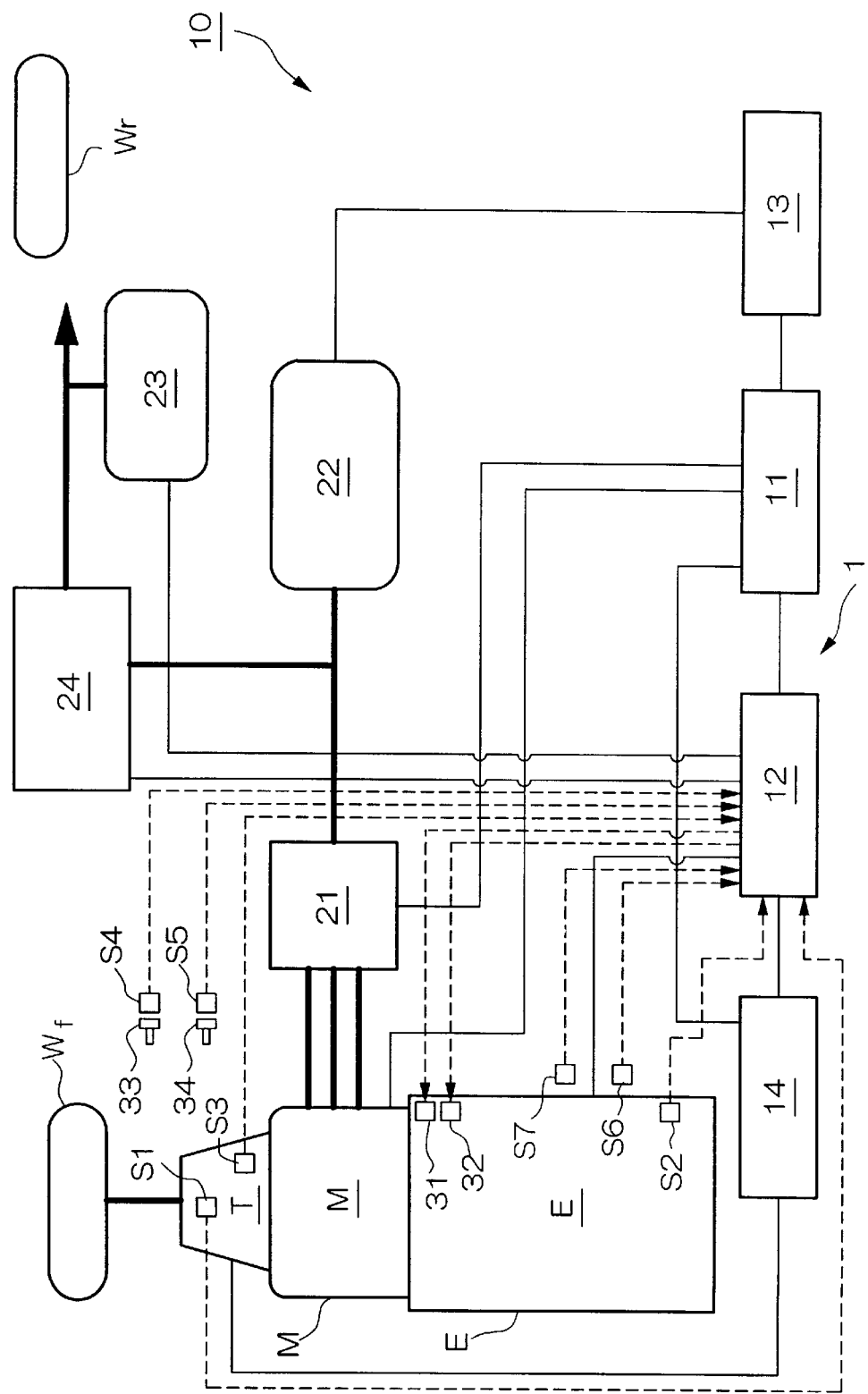
FIG. 1. is a block diagram showing the structure of a hybrid vehicle provided with a control apparatus for the hybrid vehicle according to the first embodiment of the present invention.

Hereinbelow, a control apparatus for a hybrid vehicle according to the first embodiment of the present invention will be explained with reference to the attached figures. FIG. 1 is a block diagram showing the structure of a hybrid vehicle 10, which is provided with a control apparatus 1 for the hybrid vehicle in accordance with the fist embodiment of the present invention.

This hybrid vehicle 10 is, for example, a parallel hybrid vehicle, and the drive force of both an engine E and a motor M are transmitted to the front wheels Wf, Wf which are the drive wheels, via a transmission T comprising an automatic transmission or a manual transmission. Furthermore, when the drive force is transmitted from the front wheels Wf, Wf to the motor M during deceleration of the hybrid vehicle 10, the motor M functions as a generator, and generates a so-called regenerative braking force, and the kinetic energy of the vehicle is recovered as electrical energy.

The control apparatus 1 for the hybrid vehicle according to the present embodiment is provided with a motor ECU 11, an FIECU 12, a battery ECU 13, and a CVTECU 14.

The drive and regenerative state of the motor M are conducted by a power drive unit 21 which receives control directives from the motor ECU 11. The motor M and a high voltage system battery 22, which conducts the sending and receiving of electrical energy, are connected to the power drive unit 21, and the battery 22 is one in which a plurality of, for example, 10, modules are connected in series; in these modules, a plurality of, for example, 20, cells are connected in series. A 12-volt auxiliary battery 23, which serves to drive various auxiliary devices, is installed in the hybrid vehicle 10, and this auxiliary battery 23 is connected to the battery 22 via a downverter 24. The downverter 24, which is controlled by the FIECU 12, lowers the voltage of the battery 22 and charges the auxiliary battery 23.

The FIECU 12, in addition to conducting the operation of the motor ECU 11 and the downverter 24, also conducts the operation of a fuel supply amount controller 31 which controls the amount of fuel supplied to the engine E, and the operation of a starter motor 32, and also conducts the control of the ignition timing and the like. For this reason, the following signals are input into the FIECU 12: a signal from a vehicle velocity sensor S1 which detects the vehicle velocity V based on the number of revolutions of the drive shaft in the transmission T, a signal from an engine speed sensor S2, which detects the engine speed NE, a signal from a shift position sensor S3, which detects the shift position of the transmission T, a signal from a brake switch S4, which detects the operation of a brake pedal 33, a signal from a clutch switch S5, which detects the operation of a clutch pedal 34, a signal from a degree of throttle opening sensor S6, which detects the degree of throttle opening TH, and a signal from an air intake passage pressure sensor S7, which detects the air intake passage pressure PB.

Here, the battery ECU 13 protects the battery 22 and calculates the remaining battery charge SOC of the battery 22. The CVTECU 14 conducts the control of CVT (Continuously Variable Transmission).

Figure 2:
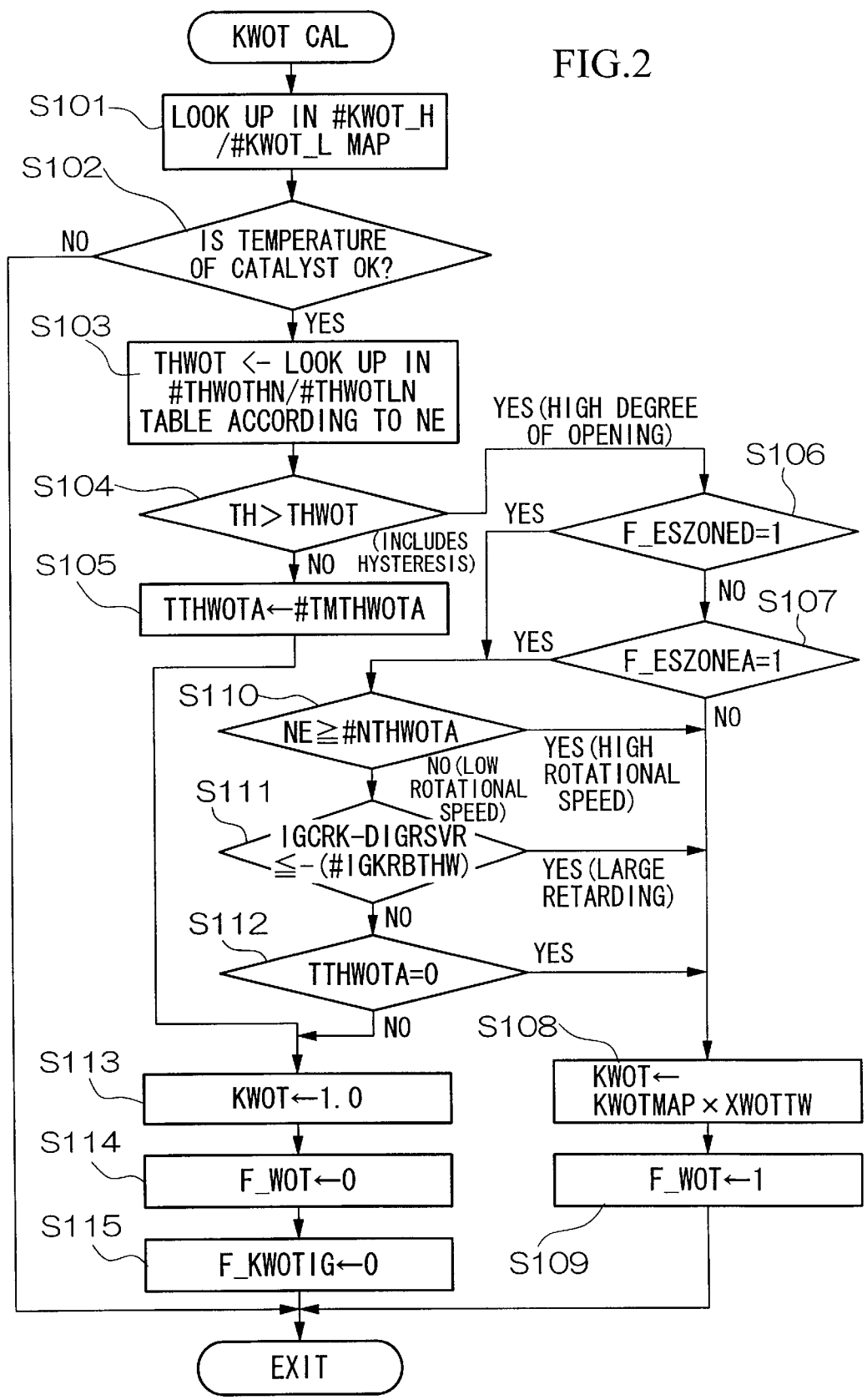
FIG. 2 is a flowchart showing the processing to set up a full throttle amount increase coefficient (hereinafter referred to as "KWOT") when the full throttle amount increase (hereinafter referred to as "WOT (Wide Open Throttle)") control is carried out.
Figure 3:
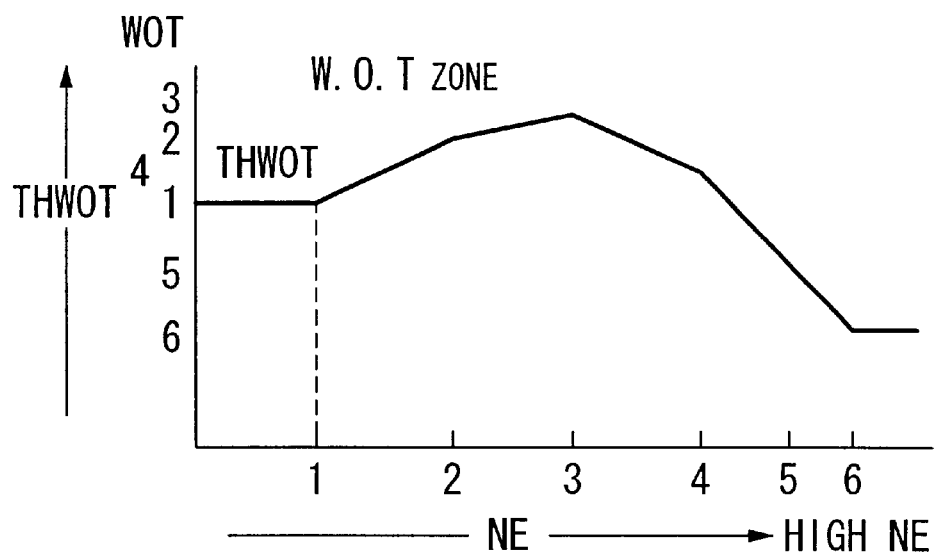
FIG. 3 is a graph showing the change in a WOT determination TH value THWOT with respect to the engine speed NE.
Figure 4:
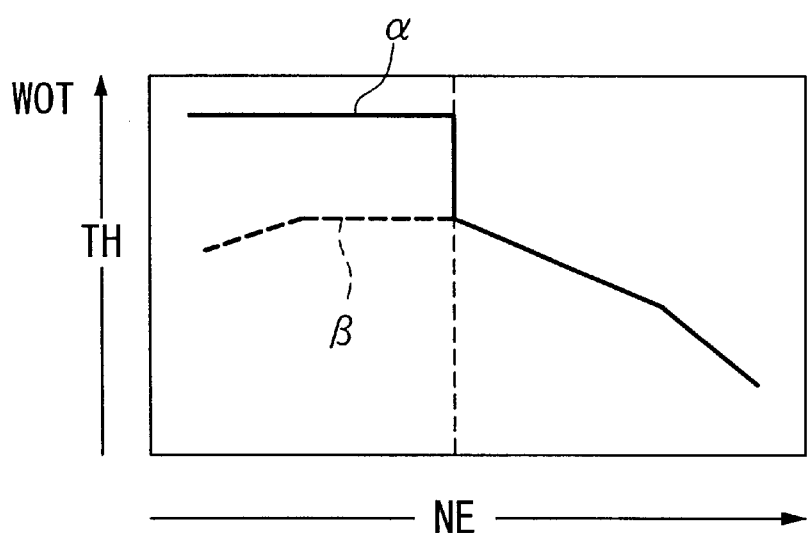
FIG. 4 is a graph showing the change in the WOT determination TH value THWOT with respect to the engine speed NE for values of remaining battery charge (also referred to as "state of charge") SOC.

The control apparatus 1 for the hybrid vehicle in accordance with the present embodiment is provided with the composition described above, and next, the operation of the control apparatus 1 for the hybrid vehicle will be explained with reference to the attached figures. FIG. 2 is a flowchart showing the processing to set up a full throttle amount increase coefficient (KWOT) when a full throttle amount increase (WOT, Wide Open Throttle) control is carried out. FIG. 3 is a graph showing the change in a WOT determination TH value THWOT with respect to the engine speed NE. FIG. 4 is a graph showing the change in the WOT determination TH value THWOT with respect to the engine speed NE for values of the remaining battery charge SOC.

Hereinafter, referring to the attached figures, the processing to set up the full throttle amount increase coefficient (KWOT) will be explained. Here, the WOT (full throttle amount increase) control is one in which the amount of fuel supplied to the engine E is increased in the amount designated by the full throttle amount increase coefficient (KWOT), whereby the output of the engine E is augmented.

First, as a coefficient relating to the increase in the amount of fuel, which is set up in case the WOT control is performed, the map value KWOTMAP of the full throttle amount increase coefficient KWOT is looked up in a map (step S101). Here, as the map value KWOTMAP of the full throttle amount increase coefficient KWOT includes hysteresis, a lower and a higher full throttle amount increase coefficient #KWOT_L and #KWOT_H are looked up in the map.

Moreover, in this map, the map values KWOTMAP of the full throttle amount increase coefficients KWOT are set to correspond to the combination of the engine speed NE and the absolute air intake passage pressure PBA, and are arranged in a matrix manner (not depicted in the figures).

Next, it is determined whether the temperature of a catalyst (not depicted in the figures) such as a catalytic converter rhodium, which is contained in an exhaust emission control device with which an exhaust system is provided, is equal to or below a predetermined temperature (step S102). When the determination is "NO", this processing series is ended.

On the other hand, when the determination is "YES", the WOT determination TH value THWOT is looked up in a #THWOTN (n=6) table shown in FIG. 3 (step S103). This WOT determination TH value THWOT is a threshold value relating to the degree of throttle opening TH to determine whether the WOT control should be performed, and is defined according to the engine speed NE. Like the process-ing shown in step S113 and the following steps described later, when the degree of throttle opening TH is below the WOT determination TH value THWOT, no WOT control is carried out.

Here, as the WOT determination TH value THWOT includes hysteresis, a lower and a higher WOT determination TH values #THWOTLN and #THWOTHN are looked up in a table. Moreover, as shown in FIG. 3, the contents of the #THWOTN table (n=6) is formed by interpolating the WOT determination TH values THWOT1 . . . THWOTn with which are provided corresponding to the respective lattice points of a predetermined number of n, e.g. n=6, that is set up in accordance with the engine speed NE.

Next, it is determined whether the degree of throttle opening TH is above the WOT determination TH value THWOT (step S104). When the determination is "NO", a subtraction timer THWOTA is set to a predetermined THWOT determination delay time #TMTHWOTA, e.g., 30 seconds (step S105). Then, the processing in step S113 and the following steps described later is carried out.

On the other hand, when in step S104 the determination is "YES", namely, when it is determined that the degree of throttle opening TH is high, it is determined whether the value of an energy storage zone D determination flag F_ESZONED is "1"(step S106).

In the battery ECU 13 according to the present embodiment, the remaining battery charge SOC which is calculated based, for example, on voltage, discharge current, temperature, and the like is divided into zones (so-called zoning), and a plurality of, for example, 4, zones A, B, C, and D are set up. In this example, using the zone A (from SOC 40% to SOC 80% through 90%), which is the normal use region, as a base, division is conducted such that the zone B (from SOC 20% to SOC 40%), which is a temporary use region, is below this, and further below this, there is the zone C (from SOC 0% to SOC 20%), which is an overdischarge region. Furthermore, the zone D (from SOC 80% through 90% to 100%) is provided above the zone A; this is an overcharge region.

When in step S106 the determination is "YES", that is to say, it is determined that the remaining battery charge SOC is within the zone D of the overdischarge state, the processing in step S110 and the following steps described later is carried out.

On the other hand, when in step S106 the determination is "NO", it is determined whether the value of the energy storage zone A determination flag F_ESZONEA is "1" (step S107).

When in step S107 the determination is "NO", that is to say, it is determined that the remaining battery charge SOC is lower than that in the zone A of normal use region, the value of the full throttle amount increase coefficient KWOT is set to the value obtained by the multiplication of the map value KWOTMAP of the full throttle amount increase coefficient KWOT, which is obtained by the lookup in the map in step S101 as mentioned above, and a high water temperature amount increase coefficient XWOTTW (step S108).

Then, an execution flag F_WOT (a start flag F_WOT) for the WOT control is set to "1"(step S109), and the processing series is ended.

That is to say, when it is determined that there is no margin in the remaining battery charge SOC, the WOT control is initiated so as to increase the amount of fuel supplied to the engine E.

On the other hand, when in step S107 the determination is "YES", the flow proceeds to step S110, and it is determined whether the engine speed NE is equal to or above a predetermined THWOT prohibiting upper limit NE value #NTHWOTA, e.g., 4000 rpm (revolutions per minute).

When in step S110 the determination is "YES", the processing in step S108 and the following steps are carried out. That is to say, when it is determined that the engine speed NE is high, even though the motor M assists the output of the engine E, the amount of the increase in the output of both the motor M and the engine E is low, thus the amount of fuel supplied to the engine E is increased so as to increase the output of the engine E.

On the other hand, when in step S110 the determination is "NO", it is determined whether the value obtained by subtracting a knock margin ignition timing DIGRSVR from a knock avoidance request retard amount IGCRK is equal to or below a value of {−(#IGKRBTHW)}, which is obtained by multiplying (−1) by a predetermined THWOT prohibiting release retard amount #IGKRBTHW relating to a delay (retarding) of the ignition timing of the engine E. In other words, it is determined whether the retarding of the ignition timing of the engine E is above a predetermined period of time (step S111). This retarding in the ignition timing can, for example, be measured by a knocking controller (not shown in figures) provided, for example, in the engine E detecting a knocking.

When in step S111 the determination is "YES", the processing in step S108 and the following steps are carried out. In this case, degradation of the exhaust system is likely due to the use of inferior gasoline as fuel, thus, from the viewpoint of protecting the exhaust system, the WOT control is initiated so as to increase the amount of fuel supplied to the engine E.

On the other hand, when in step S111 the determination is "NO", suitable gasoline is used as fuel and that there is no problem in the delay of ignition timing, it is determined whether the value of the subtraction timer TTHWOTA is zero (step S112). When this determination is "YES", the processing in step S108 and the following steps are carried out.

That is to say, in step S105, the subtraction timer TTHWOTA is set to the predetermined THWOT determination delay time #TMTHWOTA, for example, 30 seconds. Therefore, as when going up a slope and the like, when the state in which the degree of throttle opening TH is high continues over a comparatively long time until the value of the subtraction timer TTHWOTA falls to zero, it is determined that an additional increase of the output is requested, so that the amount of fuel supplied to engine E is increased so as to increase the output of engine E.

On the other hand, when in step S112 the determination is "NO", the full throttle amount increase coefficient KWOT is set to "1.0"(step S113), and the value of the WOT control execution flag F_WOT is set to "0"(step S114), further, the value of a fuel amount increase start flag F_KWOTIG due to a large knocking retard is set to "0"(step S115), and the processing series is ended.

In this case, as a result of setting the full throttle amount increase coefficient KWOT to "1.0", even if the degree of throttle opening TH temporarily becomes high and an increase of the output is requested, the amount of fuel supplied to the engine E is not increased.

That is to say, when the engine speed NE is below the predetermined THWOT prohibiting upper limit NE value #NTHWOTA, e.g., 4000 rpm, if it is determined that the remaining battery charge SOC is within the region defined as the zone A or above and that the remaining battery charge SOC has a margin, the threshold values relating to the degree of throttle opening TH, which is used to determine whether the WOT control should be carried out, are raised. That is, two kinds of threshold values are set up as shown in FIG. 4. One of these is a WOT determination TH line β (the bold dotted line in FIG. 4) in the case in which the remaining battery charges SOC is less than that in the region defined as the zone A, and another one is a WOT determination TH line α in the case in which the remaining battery charge SOC is equal to or above the region defined as the zone A (the bold solid line in FIG. 4).

According to the control apparatus 1 for the hybrid vehicle in the present embodiment, within the region in which the engine speed NE is below a predetermined THWOT prohibiting upper limit NE value #NTHWOTA, for example, 4000 rpm, when it is determined that the remaining battery charge SOC is larger than that in the zone A of normal use region, the output assistance of the engine E by the motor M can secure good drivability, and the prohibition of an increase in the amount of fuel supplied to the engine E improves the fuel consumption ratio.

Moreover, when the high degree of throttle opening TH continues for a period of time longer than a timer time #TMTHWOTA, for example, 30 seconds, which is set in the subtraction timer TTHWOTA, it is determined that the driver is demanding an increase in the output, and the amount of fuel supplied to the engine E is increased, which provides responsiveness to the intention of the driver and good drivability.

Figure 5:
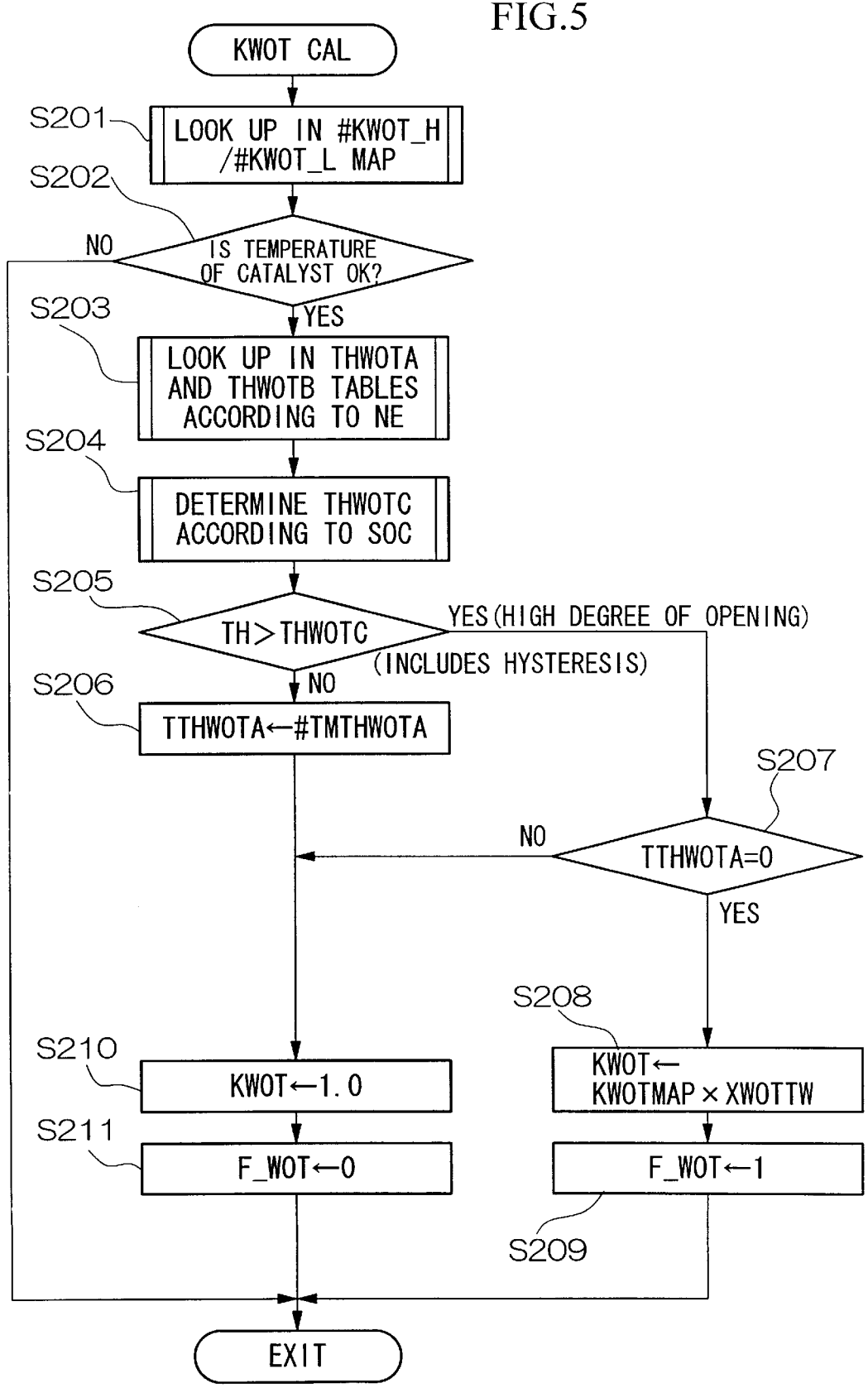
FIG. 5 is a flowchart in accordance with a control apparatus for a hybrid vehicle according to the second embodiment of the present invention, which shows the processing to set up a full throttle amount increase coefficient (KWOT) when the full throttle amount increase (WOT) control is carried out.
Figure 6:
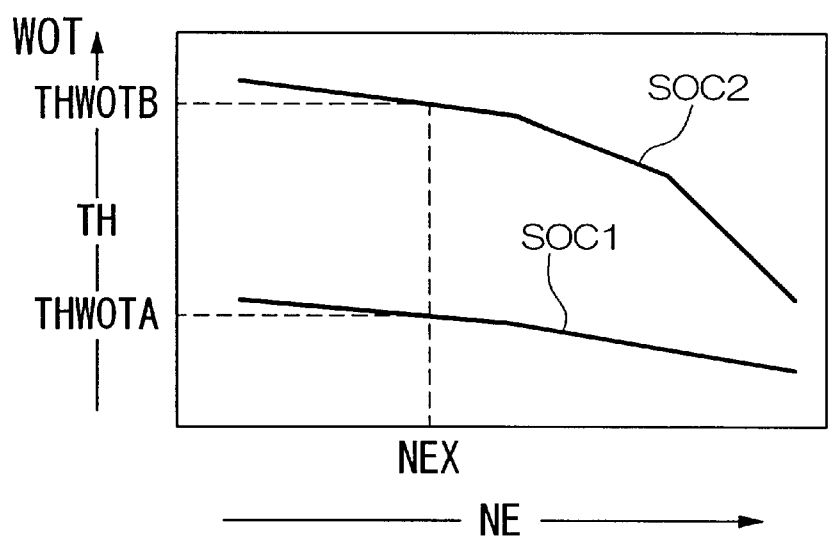
FIG. 6 is a graph showing the change in a WOT determination TH value THWOT according to the engine speed NE for each one of a plurality of, for example, two, be the first and the second remaining battery charge values SOC1 and SOC2.
Figure 7:
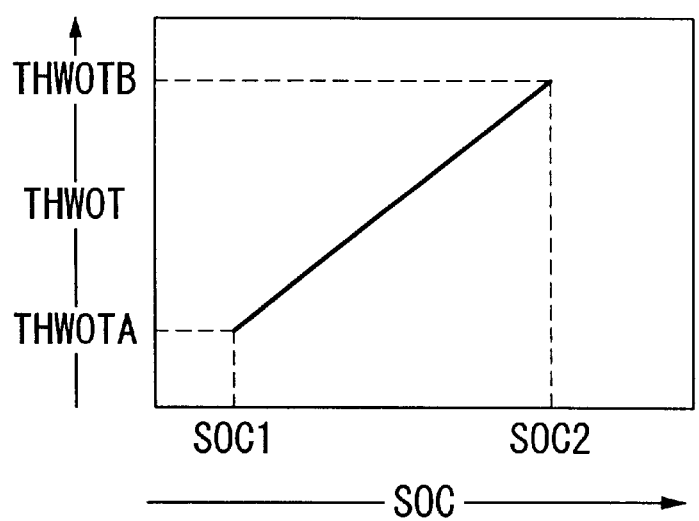
FIG. 7 is a graph showing the change in the WOT determination TH value THWOT in accordance with the remaining battery charge SOC.

Next, referring to appended drawings, the second embodiment of a control apparatus for a hybrid vehicle according to the present embodiment will be explained. The control apparatus for the hybrid vehicle according to the present embodiment is provided with the same structure as the control apparatus 1 for the hybrid vehicle in the first embodiment shown in FIG. 1. FIG. 5 is a flowchart in accordance with the control apparatus for the hybrid vehicle according to the second embodiment of the present invention, which shows the processing to set up the full throttle amount increase coefficient ("KWOT") when the full throttle amount increase ("WOT") control is carried out. FIG. 6 is a graph showing the change in the WOT determination TH value THWOT according to the engine speed NE for each one of a plurality, for example, two, be the first and the second remaining battery charge values SOC1 and SOC2. FIG. 7 is a graph showing the change in the WOT determination TH value THWOT with respect to the remaining battery charge SOC.

Hereinafter, the processing to set up the full throttle amount increase coefficient (KWOT) will be explained with reference to the appended drawings.

First, a map value KWOTMAP of the full throttle amount increase coefficient KWOT is looked up in the map as a coefficient relating to the increase in the amount of fuel, which is set up when the WOT control is carried out (step S201). Moreover, as the map value KWOTMAP of the full throttle amount increase coefficient KWOT includes hysteresis, the lower and the higher full throttle amount increase coefficients #KWOT_L and #KWOT_H are looked up in the map.

In this map, the map values KWOTMAP of the full throttle amount increase coefficient KWOT are set to correspond to the combination of the engine speed NE and the absolute air intake passage pressure PBA, and are arranged in a matrix manner (not depicted in the figures).

Next, it is determined whether the temperature of a catalyst such as a catalytic converter rhodium (not depicted in the figures), which is contained in the exhaust emission control device with which the exhaust system is provided, is equal to or below a predetermined temperature (step S202). When the determination is "NO", this processing series is ended.

On the other hand, when in step S202 the determination is "YES", the first and the second WOT determination TH values THWOTA and THWOTB corresponding to a predetermined engine speed NEX are successively looked up in the table shown in FIG. 6, for each one of the first battery remaining charge SOC1, for example, SOC 20%, and the second battery remaining charge SOC2, for example, SOC 80% (step S203).

Next, as is clear from FIG. 7, by linear interpolation between the first WOT determination TH value THWOTA at the first remaining battery charge value SOC1 and the second WOT determination TH value THWOTB at the second remaining battery charge value SOC2, which are determined in step S203, a WOT determination TH value THWOTC is determined for any values of the remaining battery charge between the first and the second remaining battery charge values SOC1 and SOC2 (step S204).

Next, it is determined whether the degree of throttle opening is equal to or above the WOT determination TH value THWOTC (step S205). When the determination is "NO", the subtraction timer #TTHWOTA is set to a predetermined THWOT determination delay time #TMTHWOTA, for example, 30 seconds (step S206). Then, the processing in step S210 and the following steps described later are carried out.

On the other hand, when in step S205 the determination is "YES", that is to say, when it is determined that the degree of throttle opening TH is high, it is determined whether the value of the subtraction timer TTHWOTA is zero (step S207).

When the determination is "YES", the flow proceeds to step S208, then the value representing a multiplication of the map value KWOTMAP of the full throttle amount increase coefficient KWOT, which is looked up in the map in step S201 described above, and the high water temperature amount increase coefficient XWOTTW is set as the full throttle amount increase coefficient KWOT (step s208), then the value of the execution flag F_WOT for the WOT control is set to "1"(step S209), and after that, the processing series is ended.

On the other hand, when in step S207 the determination is "NO", the full throttle amount increase coefficient KWOT is set to "1.0"(step S210), then the value of the execution flag F_WOT for the WOT control is set to "0"(step S211), and then the processing series is ended.

In accordance with the control apparatus for the hybrid vehicle in the present embodiment, the WOT determination TH value THWOTC, which is used to determine whether to increase the amount of fuel, is variable according to the remaining battery charge SOC. For example, when the remaining battery charge SOC is low, even if the degree of throttle opening TH is low, the increase in the amount of fuel is carried out at an early stage and good drivability can be guaranteed. In contrast to this, when the remaining battery charge SOC is large, the increase in the amount of fuel is prohibited until the degree of throttle opening TH becomes high and an increase in the output is strongly demanded. As a result of these, the fuel consumption ratio can further be improved.

Moreover, in the present invention, by means of detecting the state in which the increase in the amount of fuel supplied to the engine E is prohibited, and by increasing the amount of the supplement to the output of the engine E by the motor M, it is possible to improve the drivability.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A control apparatus for a hybrid vehicle which is provided with an engine which outputs the driving force of said vehicle; a motor which assists the output of said engine in accordance with the operational state of said vehicle; and an electricity storage device, which stores generated energy, when said motor is employed as a generator by the output of said engine, and regenerated energy, which is produced by the regenerative state of said motor when said vehicle decelerates, said control apparatus comprising:

a degree of throttle opening detector for detecting the degree of throttle opening in said engine;

an engine speed detector for detecting the speed of said engine;

a degree of throttle opening setting device for fuel amount increase determination for setting a degree of throttle opening for fuel amount increase determination, which is used to determine whether the amount of fuel supplied to said engine should be increased, according to said engine speed;

a fuel amount increase prohibiting device for prohibiting an increase in the amount of fuel supplied to said engine, when said degree of throttle opening detector detects that said degree of throttle opening is equal to or above said degree of throttle opening for fuel amount increase determination and said engine speed detector detects that said engine speed is equal to or below a predetermined engine speed;

a time measuring device for measuring the duration of the state in which said degree of throttle opening detector detects that said degree of throttle opening is equal to or larger than said degree of throttle opening for fuel amount increase determination; and a fuel amount increasing device for prohibiting the operation of said fuel amount increase prohibiting device so as to increase the amount of fuel supplied to said engine, when said duration measured by said time measuring device is equal to or larger than a predetermined time.

2. A control apparatus for a hybrid vehicle in accordance with claim 1, further comprising:

a remaining charge calculator for calculating the remaining charge in said electricity storage device;

wherein, when said remaining charge calculated by said remaining charge calculator is equal to or above a predetermined remaining charge, said fuel amount increase prohibiting device prohibits increasing the amount of fuel supplied to said engine.

3. A control apparatus for a hybrid vehicle which is provided with an engine which outputs the driving force of said vehicle; a motor which assists the output of said engine in accordance with the operational state of said vehicle; and an electricity storage device, which stores generated energy, when said motor is employed as a generator by the output of said engine, and regenerated energy, which is produced by the regenerative state of said motor when said vehicle decelerates, said control apparatus comprising:

a degree of throttle opening detector for detecting the degree of throttle opening in said engine;

and engine speed detector for detecting the speed of said engine;

a degree of throttle opening setting device for fuel amount increase determination for setting a degree of throttle opening for fuel amount increase determination, which is used to determine whether the amount of fuel supplied to said engine should be increased, according to said engine speed;

a fuel amount increase prohibiting device for prohibiting an increase in the amount of fuel supplied to said engine, when said degree of throttle opening detector detects that said degree of throttle opening is equal to or above said degree of throttle opening for fuel amount increase determination and said engine speed detector detects that said engine speed is equal to or below a predetermined engine speed; and a fuel amount increasing device for measuring the delay of the ignition timing in said engine, and for prohibiting the operation of said fuel amount increase prohibiting device so as to increase the amount of fuel supplied to said engine, when said delay of the ignition timing in said engine is above a predetermined time.

4. A control apparatus for a hybrid vehicle in accordance with claim 3, further comprising:

a remaining charge calculator for calculating the remaining charge in said electricity storage device;

wherein, when said remaining charge calculated by said remaining charge calculator is equal to or above a predetermined remaining charge, said fuel amount increase prohibiting device prohibits increasing the amount of fuel supplied to said engine.

5. A control apparatus for a hybrid vehicle which is provided with an engine which outputs the driving force of said vehicle; a motor which assists the output of said engine in accordance with the operational state of said vehicle; and an electricity storage device which stores generated energy, when said motor is employed as a generator by the output of said engine, and regenerated energy, which is produced by the regenerative state of said motor when said vehicle decelerates, comprising:

a degree of throttle opening detector for detecting the degree of throttle opening in said engine;

a remaining charge calculator for calculating the remaining charge in said electricity storage device;

an engine speed detector for detecting the speed of said engine;

a degree of throttle opening setting device for fuel amount increasing determination for setting a degree of throttle opening for fuel amount increase determination, which is used to determine whether the amount of fuel supplied to said engine should be increased, according to said engine speed for each one of a plurality of predetermined values of said remaining charge;

a degree of throttle opening change calculator for calculating the amount of the change in said degree of throttle opening for fuel amount increase determination with respect to the value of said remaining charge;

a degree of throttle opening correction device for fuel amount increase determination for correcting said degree of throttle opening for fuel amount increase determination with respect to the value of said remaining charge in accordance with said degree of throttle opening change calculator;

a time measuring device for measuring the duration of the state in which it is detected that said degree of throttle opening detected by said degree of throttle opening detector is equal to or above the degree of throttle opening for fuel amount increase determination that is corrected by said degree of throttle opening correction device for fuel amount increase determination; and a fuel amount increasing device for increasing the amount of fuel supplied to said engine, when said duration measured by said time measuring device is equal to or above a predetermined time.

* * * * *